Dec. 18, 1923.  
J. MATONICK  
RIVET HOLDER  
Filed Feb. 13, 1922
1,477,579
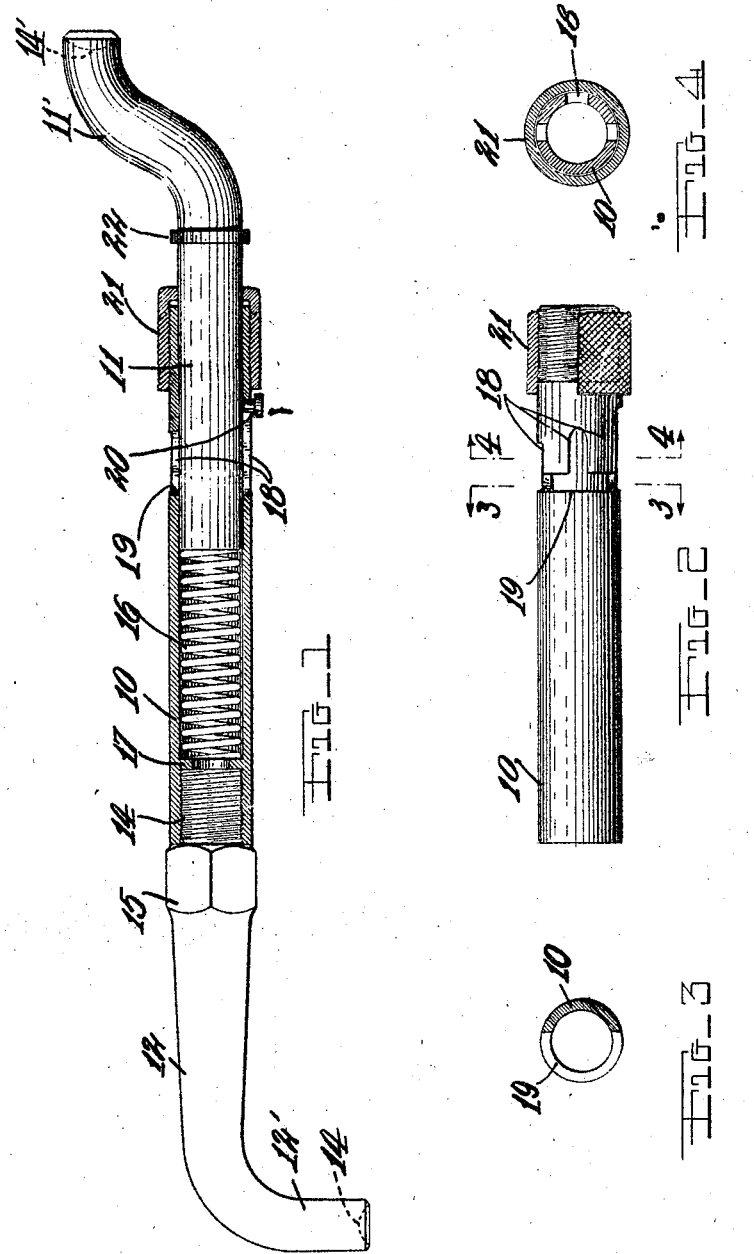
Inventor  
Joseph Matonick, Patented Dec. 18, 1923.

1,477,579

UNITED STATES PATENT OFFICE.

JOSEPH MATONICK, OF ASHLEY, PENNSYLVANIA.

RIVET HOLDER.

Application filed February 13, 1922. Serial No. 536,087.

*To all whom it may concern:*

Be it known that I, JOSEPH MATONICK, citizen of Czechoslovakia, residing at Ashley, in the county of Luzerne and State of Pennsylvania, have invented certain new and useful Improvements in Rivet Holders, of which the following is a specification.

This invention relates to rivet holders such as are used for holding rivets in place while the riveting is being done.

The invention has for an object to provide a rivet holder which can be readily applied in places inconvenient of access.

A further object is to provide a rivet holder by means of which a variable resistance may be offered to the blows of the hammer.

For further comprehension of the invention, and of the objects and advantages thereof, reference will be had to the following description and accompanying drawings, and to the appended claims in which the various novel features of the invention are more particularly set forth.

Fig. 1 of the drawings is a longitudinal sectional view, with certain parts in elevation, of a rivet holder constructed according to the invention.

Fig. 2 is a detail longitudinal view, part section and part elevation, of the intermediate element of the holder.

Fig. 3 is a transverse section on the line 3—3 of Fig. 2.

Fig. 4 is a transverse section on the line 4—4 of Fig. 2.

As here embodied my improved rivet holder comprises a central socket member 10 which supports a pair of oppositely projecting rivet engaging members 11 and 12 respectively, these members being in the form of solid circular bars inserted in the ends of the socket member. The bar 11 has its end offset laterally as at 11′, this offset end facing parallel to the axis of the bar, while the bar 12, has its end turned to face at right angles to the main length thereof as at 12′. The end faces of these bars are slightly cupped as at 14 to properly engage the rivet heads.

The bar 12 is solidly mounted in the socket 10 being here shown as screwed thereinto as at 14, being formed with a polygonal portion 15 to receive a turning wrench.

The bar 11 is slidably mounted in the socket 10, being cushioned by a coiled expansion spring 16 in the latter which bears between the end of the bar 11 and an inturned flange 17 in the socket, means being provided whereby the pressure of the spring 16 on the bar 11 may be varied.

To this end a series of longitudinal slots 18 of different length are cut in the member 10 and communicate at their rear ends with a circumferential extending slot 19. Projecting from the side of the bar 11 is a screw on stud 20 which may engage in either of the slots 18. As will be apparent, the forward ends of the slots 18 are at varying distances from the inner end of the bar 11, and the pressure of the spring 16 on the latter will vary according to which slot the screw 20 engages in. A ferrule 21 may be screwed on the outer end of the socket member 10 and may be advanced to position to engage a flange 22 on the bar 11 when it is desired to provide an unyielding abutment therefor.

It is believed that the manner of operation and use of my improved rivet holder will be readily understood from the above description. The screw 20 can be readily shifted from one of the slots 18 to another by first pressing inwardly on bar 11 until the screw registers with the transverse slot 19, when the bar is given a partial turn until the screw registers with the desired one of the slots 18, the bar 11 being then allowed to move forward, under the influence of spring 16, until the screw 20 reaches the forward end of the slot.

Having thus described my invention what I claim as new and desire to protect by Letters Patent of the United States is as follows:

1. In a rivet holder, a tubular member, a bar slidably engaged therein, said tubular member having a series of longitudinal slots of varying length united at one end by a transverse slot, a projection on said bar adapted to engage in any one of said longitudinal slots, and a spring in the tubular member pressing outwardly against said bar.

2. In a rivet holder, a tubular member, a bar slidably engaged therein, said tubular member having a series of longitudinal slots of varying length united at one end by a transverse slot, a projection on said bar adapted to engage in any one of said longitudinal slots, and a spring in the tubular member pressing outwardly against said bar, a ferrule threaded on said tubular member, and a flange element on said bar adapted to engage said ferrule, for the purpose specified.

3. In a rivet holder, a socket member, a bar slidably engaged therein, a resilient abutment for said bar in said socket member, and means providing a solid abutment for said bar independent of said resilient abutment comprising a ferrule threaded on said socket member, and a flange element on said bar adapted to engage said ferrule.

In testimony whereof I have affixed my signature.

JOSEPH MATONICK.